(12) United States Patent
Celik et al.

(10) Patent No.: US 10,207,544 B2
(45) Date of Patent: Feb. 19, 2019

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 185 days.

(21) Appl. No.: 15/351,706

(22) Filed: Nov. 15, 2016

(65) Prior Publication Data
US 2018/0134072 A1 May 17, 2018

(51) Int. Cl.
| B60C 7/14 | (2006.01) |
| B60B 9/26 | (2006.01) |
| B60C 7/10 | (2006.01) |
| B60B 3/10 | (2006.01) |
| B60C 7/24 | (2006.01) |

(52) U.S. Cl.
CPC ............... *B60C 7/14* (2013.01); *B60B 3/10* (2013.01); *B60B 9/26* (2013.01); *B60C 7/10* (2013.01); *B60C 7/24* (2013.01); *B60B 2360/32* (2013.01); *B60B 2900/111* (2013.01); *B60B 2900/321* (2013.01)

(58) Field of Classification Search
CPC ..... B60C 7/14; B60C 2007/146; B60C 15/02; B60C 15/0213; B60B 9/00; B60B 9/02; B60B 9/04; B60B 9/26
See application file for complete search history.

(56) References Cited

U.S. PATENT DOCUMENTS

| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |
| 4,602,823 A | 7/1986 | Berg |
| 4,798,418 A * | 1/1989 | Kempf .................. B60B 21/021 152/379.3 |
| 5,343,916 A | 9/1994 | Duddey |
| 5,800,643 A | 9/1998 | Frankowski |
| 6,068,721 A | 5/2000 | Dyer |
| 6,260,598 B1 | 7/2001 | Tanaka |

(Continued)

FOREIGN PATENT DOCUMENTS

WO 2017117598 A1 7/2017

OTHER PUBLICATIONS

European Search Report dated Apr. 19, 2018 for Application Serial No. EP17199919.

*Primary Examiner* — Jason R Bellinger
(74) *Attorney, Agent, or Firm* — Robert N. Lipcsik

(57) ABSTRACT

A wheel assembly includes a mounting plate for attachment to a rotatable axle, a plurality of friction plates engaging a corresponding number of notches of the mounting plate, a first annular flange fixed to first end portions of the friction plates, a second annular flange fixed to second end portions of the friction plates, and a plurality of tension claws fixed to the annular flanges adjacent the friction plates.

5 Claims, 6 Drawing Sheets

(56) References Cited

U.S. PATENT DOCUMENTS

| | | | |
|---|---|---|---|
| 6,286,572 B1 | 9/2001 | Chen | |
| 7,032,634 B2 * | 4/2006 | Laurent | B60C 7/10 |
| | | | 152/11 |
| 8,962,120 B2 | 2/2015 | Delfino | |
| 8,978,726 B2 * | 3/2015 | Detout | B60C 17/06 |
| | | | 152/158 |
| 2004/0069385 A1 | 4/2004 | Timoney | |
| 2010/0193097 A1 | 8/2010 | McNier | |
| 2012/0205017 A1 * | 8/2012 | Endicott | B60B 1/0223 |
| | | | 152/1 |
| 2014/0083581 A1 | 3/2014 | Schaedler | |
| 2016/0214435 A1 | 7/2016 | Schaedler | |
| 2018/0133992 A1 * | 5/2018 | Celik | B29D 30/0005 |
| 2018/0134071 A1 * | 5/2018 | Celik | B60B 9/10 |
| 2018/0134083 A1 * | 5/2018 | Celik | B60C 7/14 |

* cited by examiner

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a mounting plate for attachment to a rotatable axle, a plurality of friction plates engaging a corresponding number of notches of the mounting plate, a first annular flange fixed to first end portions of the friction plates, a second annular flange fixed to second end portions of the friction plates, and a plurality of tension claws fixed to the annular flanges adjacent the friction plates.

According to another aspect of the wheel assembly, the friction plates and tension claws cooperate with each other to engage parts of a tire assembly.

According to still another aspect of the wheel assembly, the friction plates are attached to the mounting plate by mechanical fasteners, such as bolts.

According to yet another aspect of the wheel assembly, the friction plates have first and second mounting holes for securing the friction plates to the annular flanges.

According to still another aspect of the wheel assembly, the friction plates have a concave surface corresponding to a shape of a part of a tire assembly to be engaged by the friction plates and the tension claws.

According to yet another aspect of the wheel assembly, the tension claws are attached to the first and second annular flanges by an interlocking arrangement.

According to still another aspect of the wheel assembly, the tension claws have a first angled notch engaging the first annular flange and a second angled notch engaging the second annular flange.

According to yet another aspect of the wheel assembly, angled surfaces of the tension claws engage corresponding axially extending tabs of the first and second annular flanges for securing a part of a tire assembly to the wheel assembly.

According to still another aspect of the wheel assembly, the tension claws have a convex surface corresponding to a shape of a part of a tire assembly and a shape of concave surfaces of the friction plates.

According to yet another aspect of the wheel assembly, the mounting plate and friction plates are constructed of metal.

A system in accordance with the present invention supports a load. The system includes a tire assembly with a spoke structure and a wheel assembly. The wheel assembly includes a mounting plate for attachment to a rotatable axle, a plurality of friction plates engaging the mounting plate, a first annular flange fixed to each of the friction plates, a second annular flange fixed to each of the friction plates, and a plurality of tension claws fixed to the annular flanges adjacent the friction plates. The friction plates and tension claws cooperate to engage the spoke structure.

According to another aspect of the system, the friction plates and tension claws cooperate with each other to sandwich parts of the spoke structure.

According to still another aspect of the system, the friction plates are secured to the mounting plate by a mechanical interlock between the first and second annular flanges and the mounting plate.

According to yet another aspect of the system, the friction plates have first and second mounting holes for securing the friction plates to the annular flanges.

According to still another aspect of the system, the friction plates each have a concave surface corresponding to a shape of a part of the spoke structure.

According to yet another aspect of the system, the tension claws are attached to the first and second annular flanges by a bolted interlocking arrangement.

According to still another aspect of the system, the tension claws have a first angled notch engaging the first annular flange and a second angled notch engaging the second annular flange.

According to yet another aspect of the system, angled surfaces of the tension claws engage corresponding axially extending tabs of the first and second annular flanges for securing the spoke structure to the wheel assembly.

According to still another aspect of the system, the tension claws have a convex surface corresponding to a shape of part of the spoke structure and a shape of concave surfaces of the friction plates.

According to yet another aspect of the system, the mounting plate and friction plates are constructed of a polymer.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly, such as that described in US 2004/0069385, incorporated herein by reference in its entirety, may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 1:
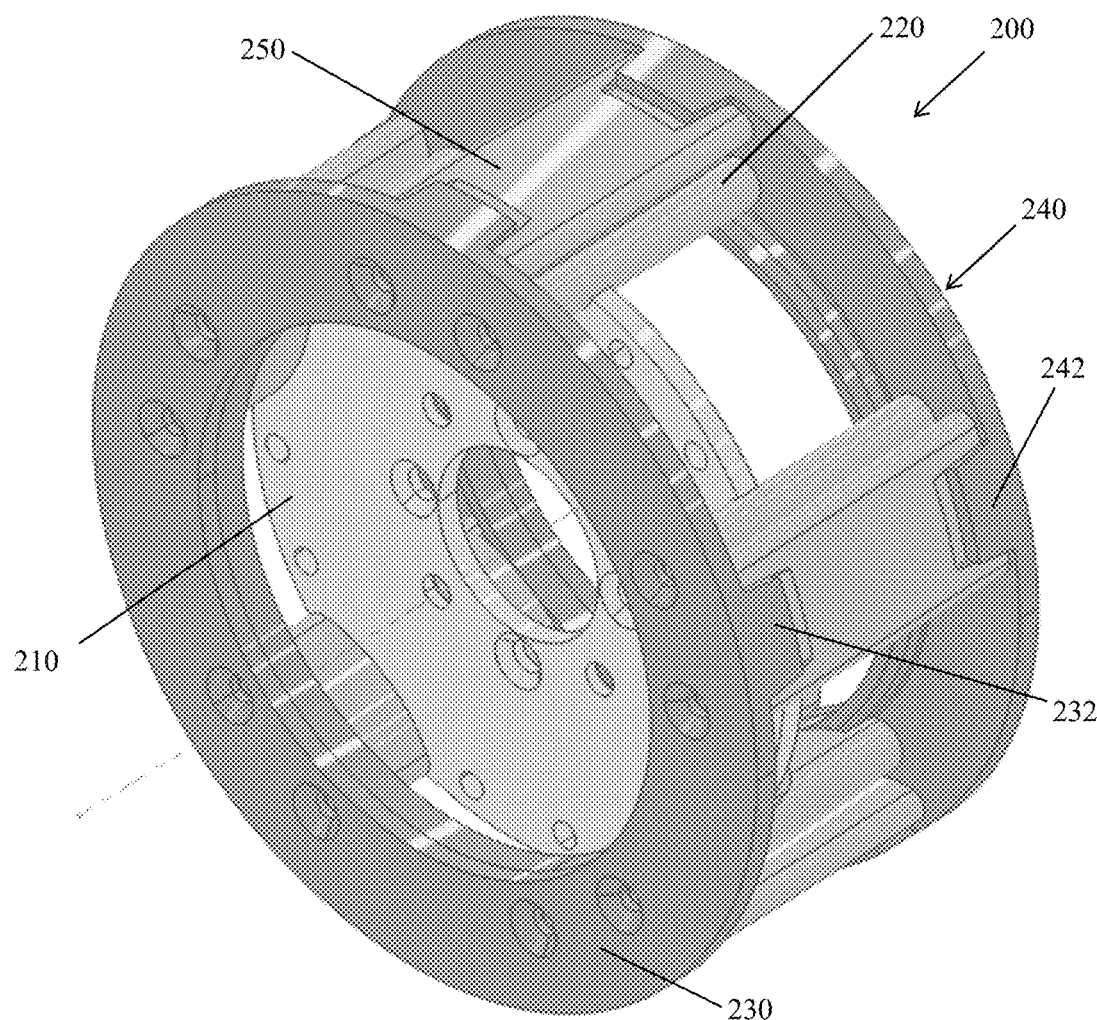
FIG. 1 is a schematic perspective view of an example wheel assembly in accordance with the present invention.
Figure 2:
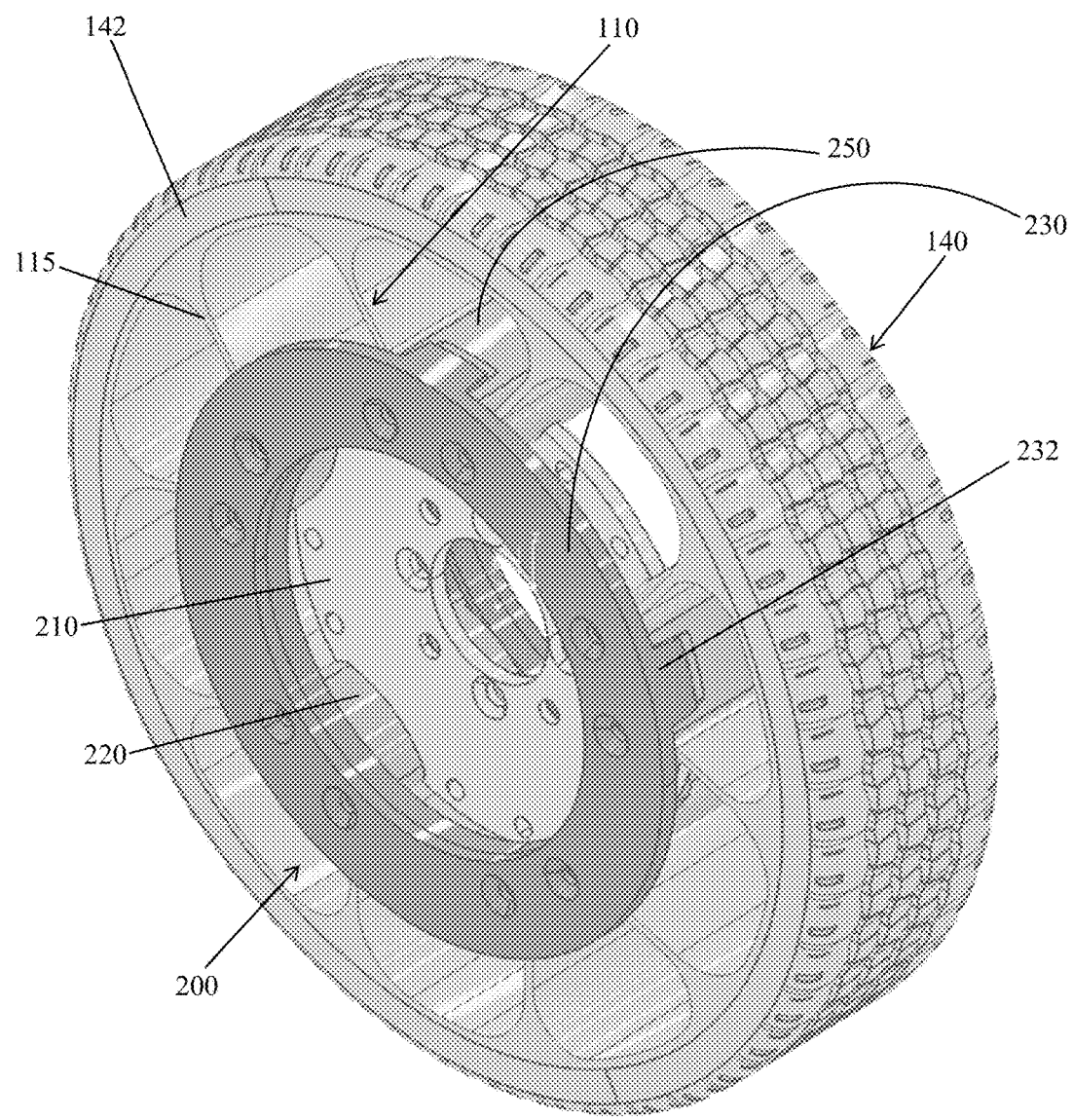
FIG. 2 is a schematic perspective view of the wheel assembly of FIG. 1 with an example tire assembly.
Figure 3:
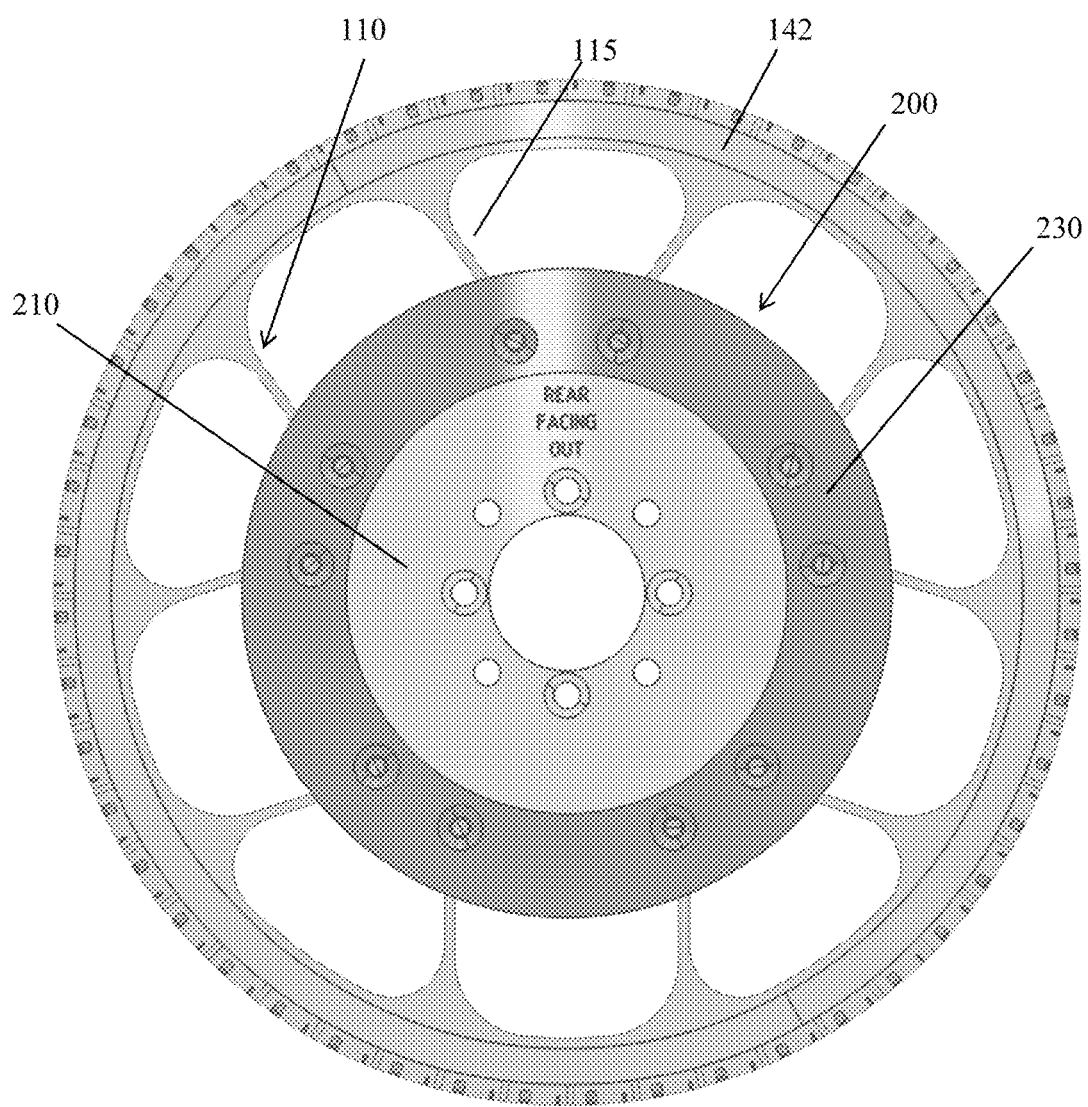
FIG. 3 is a schematic end view of the wheel and tire assembly of FIG. 2.
Figure 4:
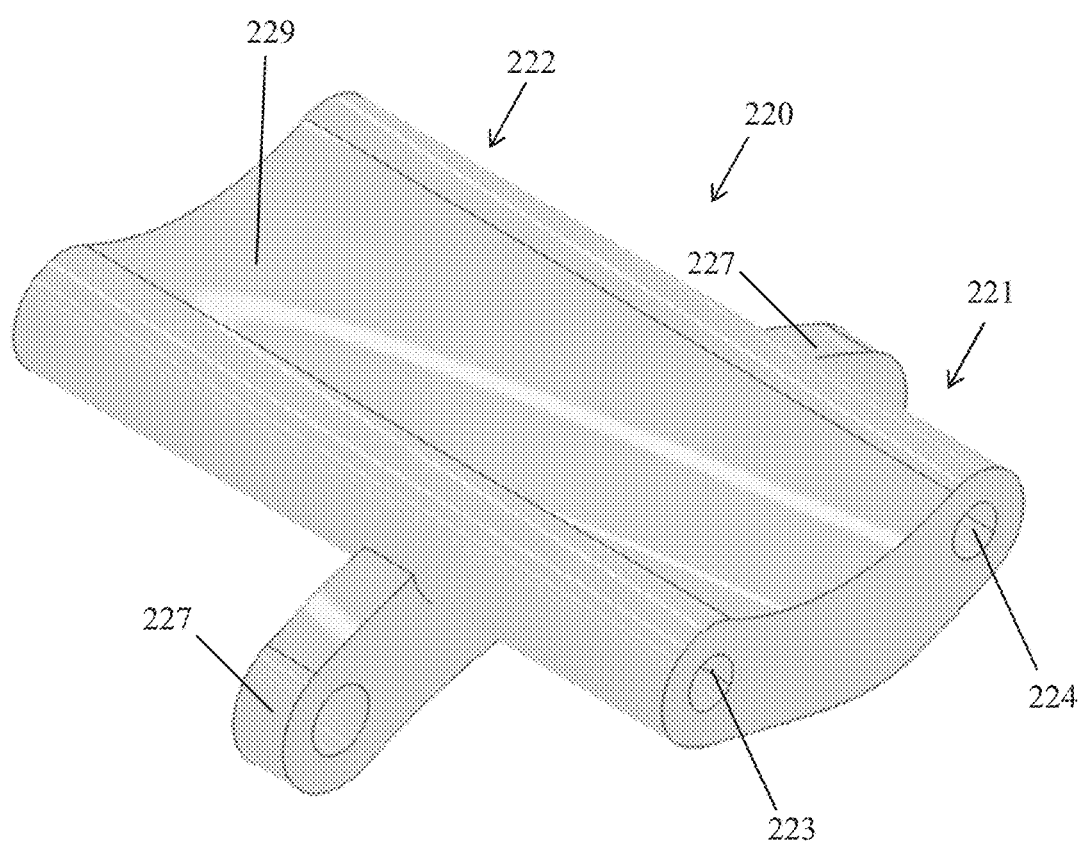
FIG. 4 is a schematic perspective view of part of the wheel assembly of FIG. 1.
Figure 5:
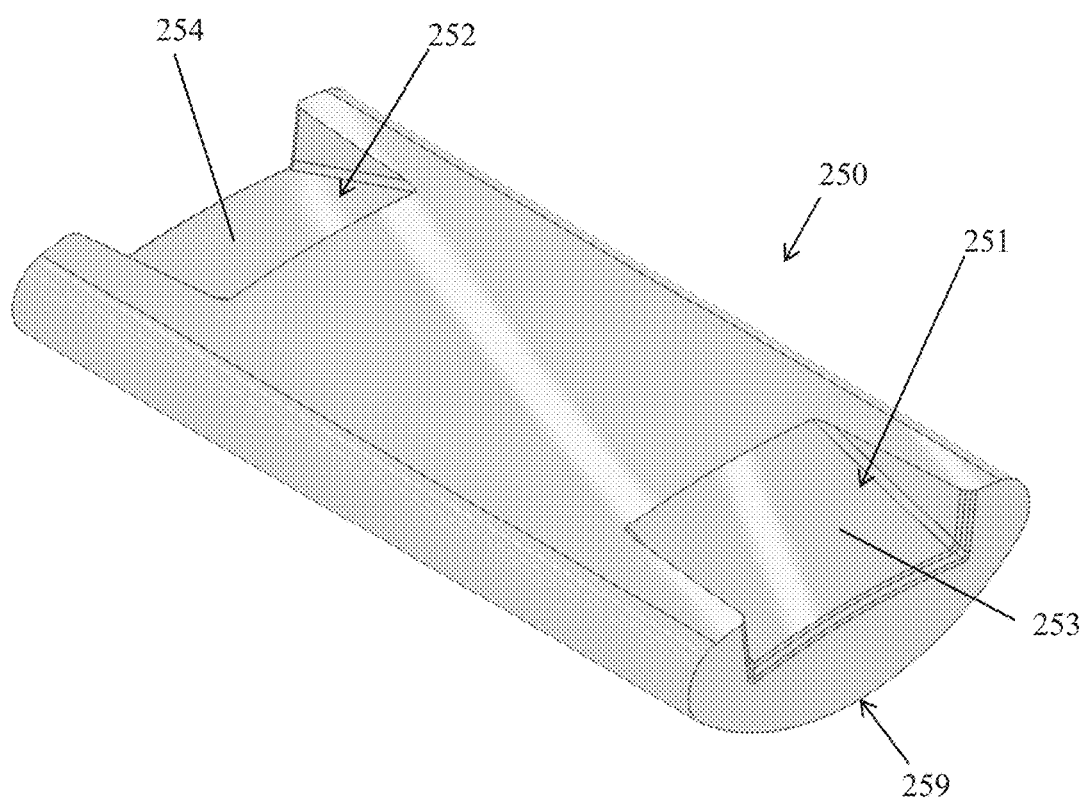
FIG. 5 is a schematic perspective view of another part of the wheel assembly of FIG. 1.
Figure 6:
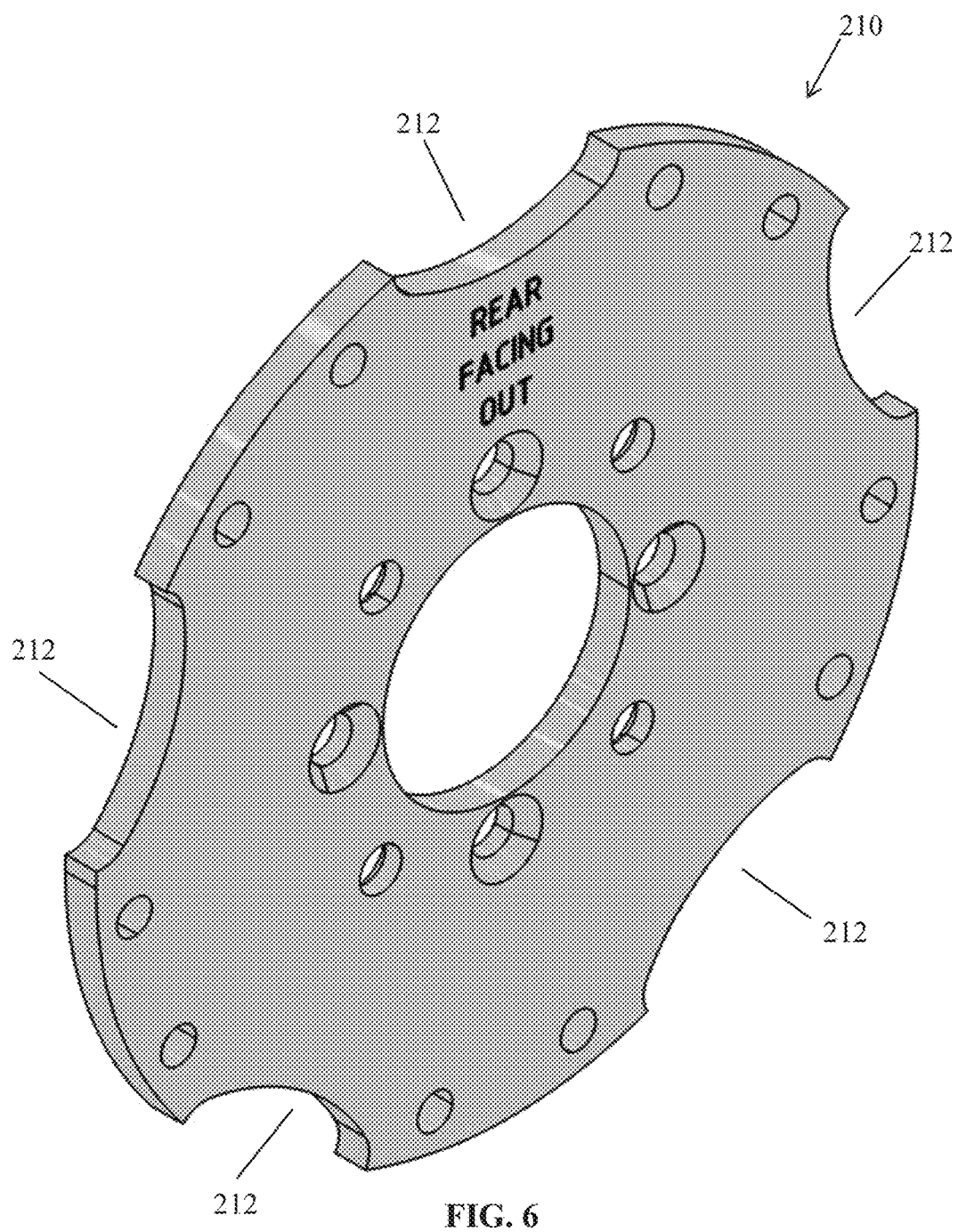
FIG. 6 is a schematic perspective view of still another part of the wheel assembly of FIG. 1.

As shown in FIGS. 2-3, an example tire assembly 140 may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may have an inner central rim, such as an automobile wheel (not shown), and a circular outer flexible ring 142, which may include a shear band and tread structure, mounted on the inner central rim by a continuous cord/fabric reinforced spoke structure 110 extending between the inner central rim and the outer ring.

The spoke structure 110 may define a plurality of cavities disposed concentrically about the inner central rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure. The cavities of the spoke structure 110 may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure 110 and create a further frictional and/or adhesive securement between the inner central rim and the spoke structure. The spoke structure 110 may comprise a homogenous or heterogeneous polymer and/or a filled polymer.

Spokes 115 of the spoke structure 110 may be curved inwardly or outwardly for mitigating or enhancing buckling of the spokes. The spokes 115 may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes 115 may be oriented at angle between 0 degrees and 90 degrees. The reinforcement of the spokes 115 may be continuously reinforced across their entire axial length. Continuous reinforcement layer(s) may extend radially outward to multiple locations adjacent to a shear band at the outer flexible ring 142.

Each cavity may have a common cross sectional profile about the axis of rotation of the assembly. Further, each cavity may have a common axial length equal to a uniform axial thickness of the spoke structure 110. Each cavity may be curvedly shaped to prevent "pinch" points on the reinforcement layer(s) and mitigate compressive stress concentrations on the reinforcement layer(s). The number of cavities may be between 2 and 60 for large scale tire assemblies 140. The inner central rim may include steel, cast iron, aluminum, aluminum alloys, magnesium allows, and/or iron alloys.

FIGS. 1-6 show a wheel assembly 200 in accordance with the present invention for use with pneumatic and/or non-pneumatic tire assemblies, such as the assembly 140. The wheel assembly 200 may include a mounting plate 210 for attachment to a rotatable axle or similar structure (not shown), a plurality of friction plates 220 engaging a corresponding number of notches 212 (FIG. 6) of the mounting plate, a first annular flange 230 fixed to first end portions 221 of the friction plates 220, a second annular flange 240 fixed to second end portions 222 of the friction plates 220, and a plurality of tension claws 250 fixed to the annular flanges 230, 240 adjacent the friction plates 220. The friction plates 220 and tension claws 250 cooperate with each other to engage parts of a tire assembly, such as the spoke structure 110 of the tire assembly 140.

The friction plates 220 (FIG. 4) may be attached to the mounting plate 210 by notch/friction plate/annular flange arrangement (e.g., mechanical interlock), welding, molding, fusing, gluing, bolting to mounting tabs 227 of the friction plates, and/or other suitably robust methods. The friction plates 220 may have first and second mounting holes 223, 224 for securing the friction plates to the annular flanges 230, 240. The friction plates 220 may have a concave surface 229 corresponding to the shape of the part of the tire assembly to be engaged by the friction plates and the tension claws 250.

The tension claws 250 (FIG. 5) may be attached to the annular flanges 230, 240 by an interlocking arrangement having a first angled notch 251 engaging one annular flange 230 and a second angled notch 252 engaging the other annular flange 240. Angles surfaces 253, 254 of the tension claws 250 may engage corresponding axially extending tabs 232, 242 of the annular flanges 230, 240 for securing the part of a tire assembly, such as the tire assembly 140, to the wheel assembly 200. The tension claws 250 may have a convex surface 259 corresponding to the shape of the part of the tire assembly to be engaged and the shape of the concave surfaces 229 of the friction plates 220.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel assembly comprising:
    a mounting plate for attachment to a rotatable axle;
    a plurality of friction plates engaging a corresponding number of notches of the mounting plate;
    a first annular flange fixed to first end portions of the friction plates;
    a second annular flange fixed to second end portions of the friction plates; and
    a plurality of tension claws fixed to the annular flanges adjacent the friction plates.

2. The wheel assembly as set forth in claim 1 wherein the friction plates are attached to the mounting plate by bolts.

3. The wheel assembly as set forth in claim 1 wherein the tension claws are attached to the first and second annular flanges by an interlocking arrangement.

4. The wheel assembly as set forth in claim 1 wherein the tension claws have a first angled notch engaging the first annular flange and a second angled notch engaging the second annular flange.

5. The wheel assembly as set forth in claim 1 wherein the mounting plate and friction plates are constructed of metal.

* * * * *